Aug. 27, 1957     H. PHILLIPSEN     2,804,416
LAMINATED FOIL ADHESIVE TAPES AND SHEETS
Filed Oct. 5, 1954     2 Sheets-Sheet 1
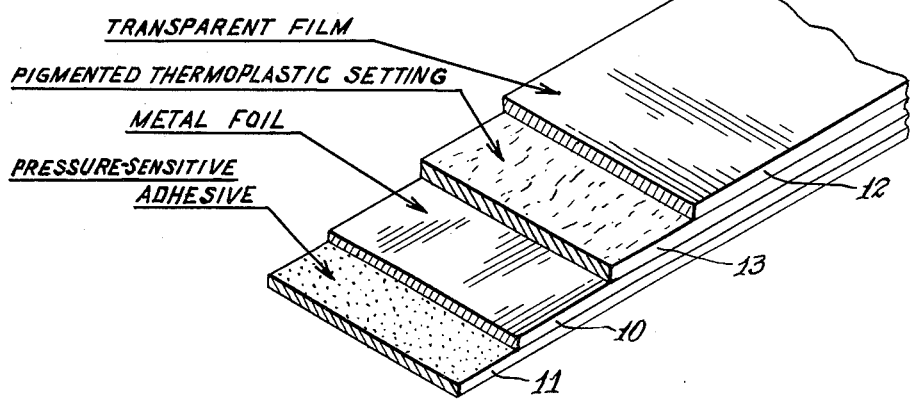
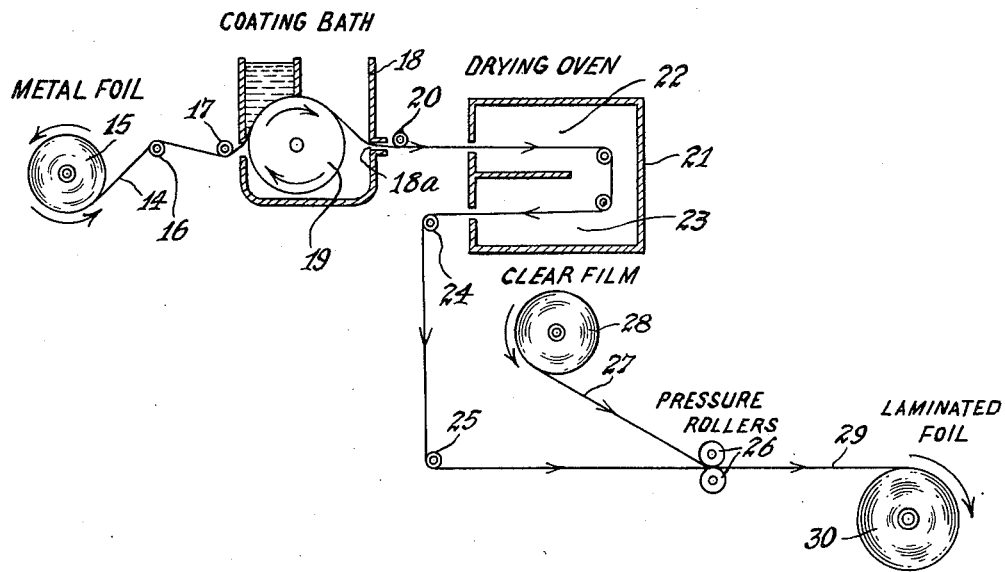
INVENTOR.
HAROLD PHILLIPSEN
BY
ATTORNEYS.

Aug. 27, 1957 H. PHILLIPSEN 2,804,416
LAMINATED FOIL ADHESIVE TAPES AND SHEETS
Filed Oct. 5, 1954 2 Sheets-Sheet 2

INVENTOR.
HAROLD PHILLIPSEN
BY
Kenyon & Kenyon
ATTORNEYS.

United States Patent Office 2,804,416
Patented Aug. 27, 1957

2,804,416

LAMINATED FOIL ADHESIVE TAPES AND SHEETS

Harold Phillipsen, Queens, N. Y., assignor, by direct and mesne assignments, of twenty percent to Sidney Rothberg, twenty percent to Allan H. Kurtzman, twenty percent to Joseph Leder, and twenty percent to Mitchell A. Rothberg, all of New York, N. Y.

Application October 5, 1954, Serial No. 460,450

5 Claims. (Cl. 154—53.5)

The present invention relates generally to adhesive-coated, flexible tapes and sheets and methods for fabricating such tapes and sheets. More particularly, the invention deals with laminated metal tapes and sheets which are coated on one side with a pressure-sensitive adhesive and which present on the other side a brilliantly-colored surface of high decorative appeal.

Pressure-sensitive tapes, bands or sheets wherein an adhesive layer is coated on a fibrous or non-metallic film are well-known and are universally used for mending, sealing, masking and in numerous other application. Such tapes are ordinarily fabricated of thin, flexible backings which may be transparent, translucent or opaque. Representative backings are non-fibrous cellulosic films, such as films of regenerated cellulose, cellulose esters, cellulose ethers and cellophane which has been waterproofed. All of such film materials generally contain plasticizers to enhance their flexibility and suppleness. While tapes of this type are easy to apply and are of value in emergency situations, their utility is limited by the fact that the backing is of low internal cohesiveness and is adversely affected by alkalies or acids. In some instances, the backing is pigmented for decorative purposes, but in such cases the color exhibited by the tape is flat and lustreless.

Attempts have heretofore been made to produce metal-backed tapes, but these tapes have not succeeded commercially to any great extent by reason of certain drawbacks. Metal foils possess a low tensile strength and when subjected to flexing or stretching, they readily break. Difficulties, too, are experienced in anchoring the pressure-sensitive adhesive to such metals as aluminum and lead, for the adhesive tends to separate from the metal foil—especially after protracted storage of the tape. Moreover, the exposed and unprotected metal surface is unattractive in appearance and becomes increasingly so with time, so that the metallic tape is of little ornamental value.

In view of the foregoing, it is the chief object of the present invention to provide a pressure-sensitive adhesive tape or sheet having not only the usual functional properties but also those qualities of visual attractiveness rendering it useful for a great variety of decorative purposes.

More particularly, it is an object of the invention to provide a laminated metal tape or sheet characterized by high tensile strength and an attractive appearance, and to provide a method for fabricating same. A tape in accordance with the invention is thin, flexible, long-lasting and easy to clean. Another important characteristic is that the tape is impervious to alkalies and acids.

It is another object of the invention to provide a laminated metal-foil tape constituted by a transparent film so bonded to the metal foil that the metal is protectively sheathed, and the resultant tape is of high tensile strength.

A further object of the invention is to provide a tape of the above-described type wherein a transparent film is bonded to the metal foil by means of a pigmented adhesive, whereby the metal foil acts as a reflecting surface to form a colored tape of high lustre. Thus, laminated tape in accordance with the invention is useful as an ornamental band for display packages and the like. A significant feature of the invention is that a variety of brilliant metallic colors may be developed from a metal-foil backing of one type. For example, with an aluminum-foil backing, it is possible to produce tapes having a golden, bronze or silver appearance. In addition to the customary masking and general sealing applications, a tape in accordance with the invention is of value for the decorative banding of Christmas packages, for signs, window displays and in the art field.

It is a further object of the invention to provide a tape which may be inexpensively manufactured and sold at low cost.

For a better understanding of the invention as well as other objects and further features thereof, reference is had to the following detailed description to be read in conjunction with the accompanying drawing wherein:

Fig. 1 is a perspective view, in exaggerated form, of a first preferred embodiment of a tape in accordance with the invention.

Fig. 2 is a schematic diagram illustrating the method of laminating the back of the take.

Figure 3:
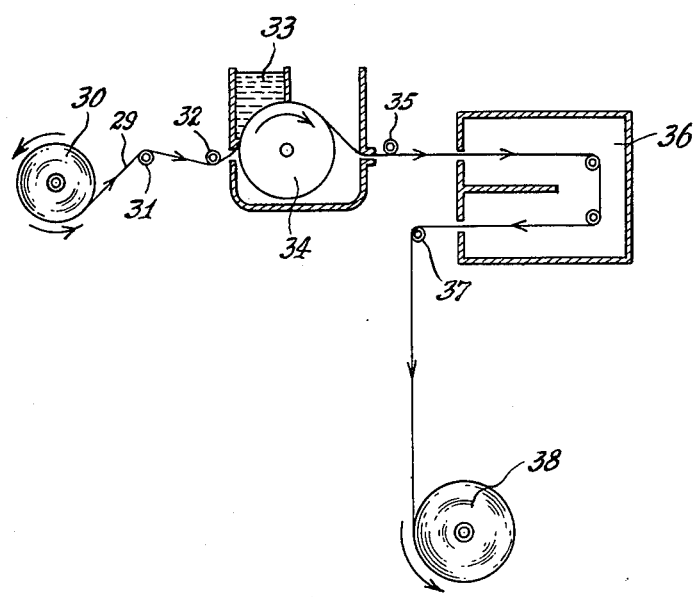
Fig. 3 is a schematic diagram illustrating the method of applying the pressure-sensitive adhesive to the laminated foil.

Referring now to Fig. 1, a tape or sheet in accordance with the invention is constituted by a metal-foil backing 10, the under-side of which is coated with normally tacky and pressure-sensitive adhesive layer 11 of a suitable thickness. Laminated to the exposed side of the backing 10 is a transparent film 12, the film being bonded to the foil by means of a colored thermoplastic adhesive layer 13.

Metal-foil backing 10 is preferably constituted by aluminum material having a minimum gauge of .0025 inch. The type of aluminum foil employed may be either dead soft (0), semi-hard (H–14) or hard (H–18). The type of foil selected in a given tape depends both on the desired strength of the material and its ability to be laminated with a given plastic film.

Transparent film 12 may be constituted by such materials as vinyl, saran, Geon, Pliofilm, or polyethylene which are not affected by moisture or shrinkage and are impervious to alkalies or acids, whether weak or strong. The gauge of the film lamination preferably ranges from .001 inch to higher values. The film used to laminate the foil backing may or may not contain any given degree of plasticizer. Thus, there exists no restriction in the lamination process as regards the rigidity of the film to be used as the laminant.

The pressure-sensitive adhesive layer 11 may be of any suitable composition which is not only tacky and non-offsetting, but which is also water-insoluble and moisture-proof. Such an adhesive may be formed by methods which are well-known in the art. For example, it may be formed by mixing crude rubber with zinc oxide, and the material may be maintained in the tacky state by mixture with such ingredients as oil, pitch, etc. Another such adhesive may be formed by a mixture of latex crepe, zinc oxide, diamyl hydroquinone antioxidant, polyterpene and wool fat. A preferred form of adhesive is that sold by the Paisley Products Corporation as "Adhesive 7414."

The thermoplastic adhesive 13 is mixed with a pigment of the desired hue prior to the laminating process. The color of the adhesive will determine the decorative finish of the tape and will impart to the aluminum foil the metallic appearance of other metals. Thus, a golden finish of high lustre may be obtained, the aluminum acting as a reflector for the pigmentation in the bonding layer. The aluminum surface on which the pressure-sensitive adhesive is applied is preferably first coated with a primer, such as one formed by a thin layer of a composition of vinyl chloride acetate copolymer and acrylic-butadiene copolymer.

It is important to note that the pressure-sensitive adhesive may be applied to the under-side of the aluminum without the use of a primer. Generally, it has been found that with film backings, such as vinyl, the use of a primer is essential in order to have the adhesive layer remain in contact with the film. However, both the primer and the adhesive contain solvents whose properties adversely affect the film backing unless the process is carefully conducted. For example, while processing film backing in the initial stage in which a primer is applied, in the event a break occurs in the film while the apparatus is in operation, the primer by reason of solvents contained therein will immediately attack the film, causing it to become distorted and will also attack the film rollers making it necessary to thoroughly clean the rollers before resuming operation. This situation, which is not uncommon in practice, gives rise to serious time delays, for it becomes necessary to reset the film as well as the roller equipment. An aluminum backing, on the other hand, is not adversely affected by the solvents in the primer; hence, when a primer is used thereon, the process can be carried out without difficulty and is less costly. It is also possible to process aluminum without the use of a primer, whereas in a film backing a primer is essential.

Referring now to Fig. 2 illustrating the method for laminating the aluminum foil, it will be seen that the foil 14 is drawn in the form of a continuous web from a supply roll 15. The foil from the roll passes over an idler roller 16 and under an idler roller 17, thence into a bath 18 containing a thermo-setting adhesive solution. The adhesive is constituted by a solution suitable for bonding a plastic, transparent film to the aluminum foil, the adhesive solution including a volatile solvent and pigmentation of the desired hue. The foil is drawn over a rotary drum 19 mounted within the bath, the adhesive solution making contact with the upper surface of the foil passing through the bath. Foil 14 is then withdrawn from the bath through an exit orifice 18a having lips which are spaced to secure the desired thickness of coating. In lieu of said lips, stationary cylinders in spaced relation may be mounted within the bath to secure the desired thickness of coating.

The wet-coated foil then passes under an idler roller 20 and enters a drying oven 21 for removal of the solvent. The wet foil moves horizontally forward through an upper duct 22, maintained at a predetermined temperature sufficient to effect substantial drying of the coating, and then through a lower duct 23 maintained at a reduced temperature sufficient to complete the drying. The foil leaving oven 21 is drawn vertically down idler roller 24 and under idler roller 25, the foil thereafter passing between a pair of pressure rollers 26. Also fed between pressure rollers 26 is a transparent non-metallic film 27, such as vinyl, the film being unwound from a roll 28 and being bonded to the foil under pressure. The resultant laminated foil 29 is then wound on a roll 30.

In applying the pressure-sensitive adhesive to the aluminum side of the laminated foil, as shown in Fig. 3, the laminated foil 29 on roll 30 is fed over idler roller 31 and under idler roller 32 into a coating bath 33. In the bath, the laminated foil passes over a rotary drum 34 and is coated with a pressure-sensitive adhesive solution in a volatile solvent. The laminated foil, thus coated, is withdrawn from the bath and passes under an idler roller 35 into a drying oven 36 similar to that shown in Fig. 2 and adapted to evaporate the solvent. The finished, adhesive coated, laminated foil then passes over idler roller 37 and is wound, with the colored side out, on a roll 38. Obviously, the manufacture of the laminated tape, which involves the lamination of the foil and the application of a pressure-sensitive adhesive thereto, may be carried out in a single and combined apparatus, rather than by the separate means shown in Figs. 2 and 3.

Figure 4:
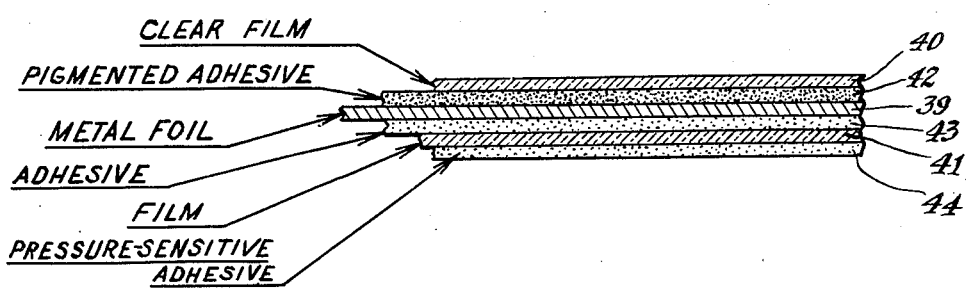
Fig. 4 is a sectional view of a second preferred embodiment of a tape in accordance with the invention.

Referring now to Fig. 4, another preferred embodiment of a laminated tape or sheet is shown comprising a metal backing 39, preferably formed by aluminum foil, on either side of which is bonded a thin layer of flexible plastic film 40 and 41, respectively. The outer layer 40 is of transparent material and is laminated to backing 39 by means of a pigmented adhesive 42, in the same manner disclosed in connection with Fig. 1. The inner layer 41 may be constituted by a material identical to that of layer 40 and is bonded to the foil by a non-pigmented adhesive 43. Alternatively, the inner layer 41 may be formed of an opaque material since this layer does not contribute to the ornamental appearance of the tape. Coated on the bottom surface of the film layer 41 is a pressure-sensitive adhesive 44.

Thus, the tape or sheet is formed by a metallic foil protectively sheathed on either side with a plastic film. The resultant laminated structure possesses exceptional tensile strength and has unusual durability. The visible side of the tape has, of course, a bright, metallic lustre. Preferably, the films 40 and 41 are formed of "Mylar," a highly transparent polyester film made from polyethylene terephthalate—the polymer formed by the condensation reaction between ethylene glycol and terephthalic acid. "Mylar" films have excellent mechanical properties, the tensile strength at "break" being two to three times that of cellophane and having far greater resistance to flexing failure. "Mylar" is resistant to all solvents of phenols and cresols.

While the invention has been described in connection with tapes or uniform sheets, it is to be understood that the invention is not limited to such forms. The laminated structure disclosed herein may be made in any desired configuration. For example, it may be shaped so as to constitute alphabetical letters for display purposes, or as to constitute stickers for a variety of applications. The pressure-sensitive adhesive coating may carry a protective paper line which can be stripped when the sticker is to be used.

While there has been shown what is considered to be preferred embodiments of the invention, it is to be understood that many modifications and changes may be made therein without departing from the essential aspects of the invention. It is intended, therefore, in the appended claims to cover all such changes and modifications as fall within the true scope of the invention.

I claim:

1. A laminated adhesive tape comprising a metal-foil backing providing a light-reflecting surface, a normally tacky and pressure-sensitive adhesive coated on one side thereof, a transparent flexible film, and an adherent layer bonding said film to the other side of said backing and including pigmentation which is reflected by said backing to impart a color of high lustre to said tape.

2. A laminated adhesive tape comprising an aluminum-foil backing providing a light-reflecting surface, a normally tacky and pressure-sensitive adhesive coated on one side thereof, a transparent flexible film, and an adhesive bonding said film to the other side of said backing including pigmentation which is reflected by said backing to impart a metallic color of high lustre to said tape, said color being at variance with the normal color of aluminum whereby the resultant color is a composite of the color of said aluminum and that of said pigmentation.

3. A laminated adhesive tape comprising an aluminum-foil backing providing a light-reflecting surface and having a minimum gauge of .00025 inch, a normally tacky and pressure-sensitive adhesive coated on one side of said backing, a clear vinyl film having a minimum gauge of .001 inch, and a pigmented adhesive bonding said film to the other side of said backing, said pigmented adhesive being reflected by said backing to impart a metallic lustre to said tape.

4. An adhesive tape comprising a metal-foil backing providing a light-reflecting surface, flexible films bonded to respective sides of said backing, one of said films being bonded to said backing by a pigmented adhesive which is reflected by said backing to provide a tape of high lustre, and a pressure-sensitive adhesive coated on the exposed surface of the other of said films.

5. An adhesive tape comprising a metal-foil backing providing a light-reflecting surface, flexible films bonded to respective sides of said backing, one of said films being bonded to said backing by a pigmented adhesive which is reflected by said backing to provide a tape of high lustre, and a pressure-sensitive adhesive coated on the exposed surface of the other of said films, said films being formed by a polyester film made from polyethylene terephthalate.

References Cited in the file of this patent

UNITED STATES PATENTS

| | | |
|---|---|---|
| 1,999,413 | Hemming et al. | Apr. 30, 1935 |
| 2,017,367 | Kurz | Oct. 15, 1935 |
| 2,057,042 | McLaurin | Oct. 13, 1936 |
| 2,077,998 | Humphner | Apr. 20, 1937 |
| 2,197,405 | Edwards | Apr. 16, 1940 |
| 2,383,884 | Palmquist | Aug. 28, 1945 |
| 2,529,884 | Reynolds | Nov. 14, 1950 |
| 2,551,591 | Foord | May 8, 1951 |
| 2,697,084 | Eger | Dec. 14, 1954 |